United States Patent [19]

Andersen

[11] 4,052,562
[45] Oct. 4, 1977

[54] SYSTEM FOR CONTROL OF SPEECH DIRECTION IN DUPLEX TELEPHONE CIRCUITS

[75] Inventor: Bjorn Andersen, Osteras, Norway
[73] Assignee: Maxman AG, Chur, Switzerland
[21] Appl. No.: 624,250
[22] Filed: Oct. 20, 1975
[30] Foreign Application Priority Data
  Oct. 29, 1974 Norway ................................ 743893
[51] Int. Cl.² ............................................. H04M 1/60
[52] U.S. Cl. .................................................. 179/1 HF
[58] Field of Search ............. 179/1 CN, 1 HF, 1 VC, 179/15 AQ, 15 AS

[56] References Cited

U.S. PATENT DOCUMENTS

| | | | |
|---|---|---|---|
| 3,027,429 | 3/1962 | Eklov ................................ | 179/1 HP |
| 3,794,763 | 2/1974 | Boudewijns et al. ............. | 179/1 HF |
| 3,801,747 | 10/1972 | Queffeulou ...................... | 179/15 AS |
| 3,832,491 | 8/1974 | Sciulli et al. ....................... | 179/1 VC |
| 3,848,093 | 11/1974 | Edstrom .......................... | 179/15 AS |
| 3,927,267 | 12/1975 | Voyer et al. ..................... | 179/15 AQ |

*Primary Examiner*—Kathleen H. Claffy
*Assistant Examiner*—E. S. Kemeny
*Attorney, Agent, or Firm*—Young & Thompson

[57] ABSTRACT

A system for control of speech direction in duplex telephone circuits (e.g. hands-free telephones), derives a switching control signal proportional to both the immediate transmit-channel signal value, and a Regulating Value which is the ratio of the Receive-Channel Signal to the Transmit-Channel Signal under no-local-sound-source condition. Thus the Regulating Value is proportional to the local acoustic feedaround (Overhearing) signal between local loudspeaker to microphone. The Regulating Value responds to faster variations (caused by speech) to cause direction-switching, but merely compensates for slower variations (caused by movement of people or microphone in the local room). Switching (Breakthrough) of the microphone to On and the loudspeaker to Off also depends on the magnitude of the closed-channel (non-connected) microphone signal exceeding that of the open channel.

5 Claims, 10 Drawing Figures

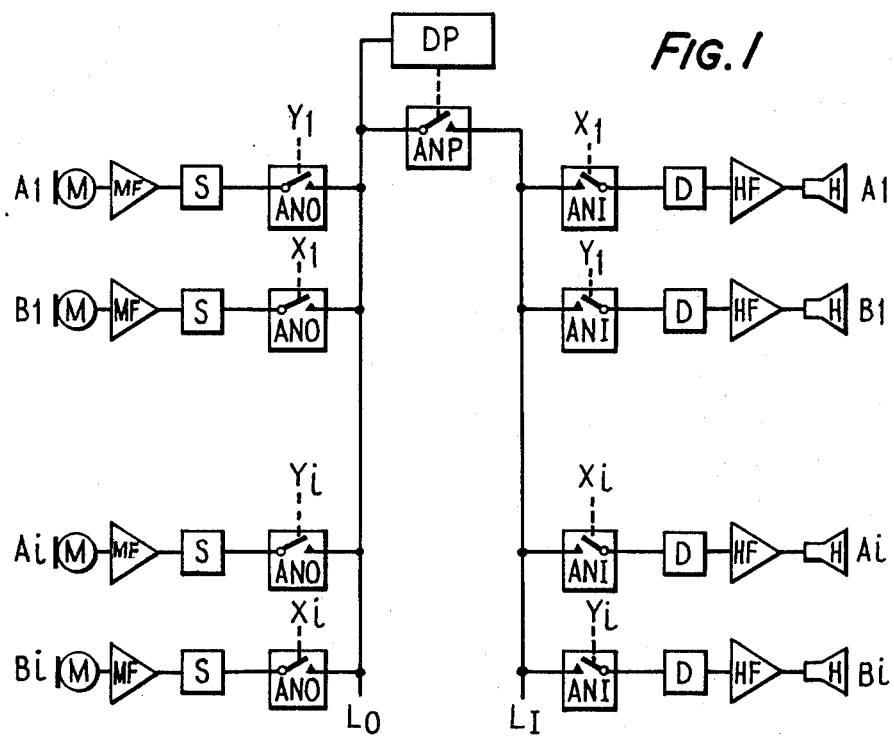
FIG. 1
FIG. 2
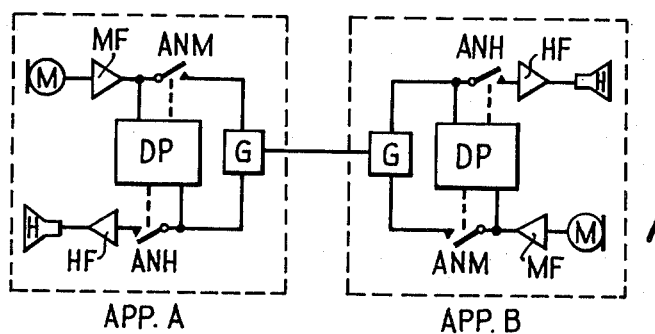
FIG. 3

FIRST ESTABLISHED TIME UNIT

SYSTEM FOR CONTROL OF SPEECH DIRECTION IN DUPLEX TELEPHONE CIRCUITS

This invention relates to systems for controlling the speech direction in duplex telephone circuits which utilize a control member in both the transmitting channel and in the receiving channel. The control inputs to these control members are connected to the complementary outputs of a bistable element which is governed by a comparison device, the signal inputs of which are connected to the transmitting and receiving channel signals channel in front of their control members. This comparison device, on the basis of the envelope curves of an analysis of the speech signals, controls the direction of speech.

In systems of this type, the comparison device must deal during its analysis of the envelope curves of the speech signals with two types of distortion present in these signals. The first type of distortion is phase distortion and is present mainly in the "overhearing component" of the microphone signal, i.e. that component of the microphone signal which is representative of the sound the microphone has picked up from the loudspeaker. Because sound travels relatively slowly, the overhearing component in the envelope curve of the microphone signal will lag in phase behind the envelope curve of the loud-speaker signal. The second type of distortion is frequency distortion. It occurs in the "overhearing component" because of the nonlinear frequency transfer characteristics from the loud-speaker to the microphone and also occurs in the signals which circulate through the hybrid junction due to nonlinearities in the hybrid junction.

In order to obtain effective switching quality, practically speaking all known systems are provided with frequency correcting links placed in front of the circuit for producing the envelope curves of the speech signals. These frequency correcting links are usually permanently adjusted, which necessitates relatively strong acoustic coupling between the loud-speaker and microphone in order to dampen the effect of external, more variable conditions, such as difference in room acoustic, etc. Also the signal channels usually operate with a permanently ajusted amplifying factor which is directly determined by the loud-speaker to microphone transfer characteristic of the apparatus. This in addition to that previously mentioned requires that the loud-speaker to microphone transfer characteristic of the various apparatus must be held within very narrow tolerances, in order to achieve good switching quality.

The object of the invention is to avoid the above described disadvantages and to provide a system which automatically adjusts itself in accordance with varying acoustic conditions and changes in the overhearing characteristic between loud-speaker and microphone, so that an optimal adjustment is maintained at all times, and can be produced with integrated circuit technique with a minimum of external discrete circuit elements, and which can operate in time multiplex, i.e. which can handle sampled information, so that it can serve a large number of communication channels simultaneously.

According to the invention, this is achieved by using a comparison means which is provided with at least two complementary signal outputs for delivering output signals having a predetermined function of its input signals, a delay element coupled to each complementary signal output of the comparison means, signal treatment devices for delivering output signals which are related, as by the said predetermined function, to the input signal, each having a first input coupled to the corresponding delay element output, and a second input coupled to the channel in front of the control member, and switch means each provided with a switch control input, and active terminal and a first and second passive terminal, which active terminal is connected to the signal input of the comparison device, the first passive terminal is connected to the output of the corresponding signal treatment device, the second passive terminal is connected to the corresponding channel in front of the control member and the control input of each switch means is connected to the corresponding decision output of the bistable element which connects the input of the corresponding comparison device to the output of the corresponding signal treatment device if the channel is closed, or connects the input of the corresponding comparison device to the corresponding channel if this channel is open.

In an advantageous embodiment of the invention the logarithm of the demodulated speech signals are sampled and are introduced in sampled sequence into the speech signal treatment device which comprises a signal storage means with a recirculating loop containing an arithmetical means, the said stored signal values being compared in the comparison means the output signal of which is introduced in a regulating signal storage means with a recirculation loop. This "regulating signal storage means" stores the value of the measured difference between the logarithm of the demodulated loudspeaker signal and the logarithm of the demodulated microphone signal when due to sounds picked up by the microphone from the loud-speaker (re "overhearing component"). Later, when an open microphone channel is being tested for "break-through," the microphone signals are added to this "regulating" signal and compared with the loud-speaker signal. If equal, there is merely "overhearing." If not equal, there is "breakthrough" and the channel directions will switch. Note the importance of the logarithm — without it, the regulating signal value would have to be a number representative of the ratio between the loud-speaker signal and the microphone overhearing component. This would necessitate digital division to calculate the regulating value and digital multiplication in its usage (i.e. to see if the microphone signal being received is merely an overhearing component). However, when the log of the signals are taken then the much simpler operations of addition and subtraction can be substituted for multiplication and division, respectively. Moreover, all signal storage devices contain many cells and operate in a recirculating fashion. The reason is that the system is to be used in a "centralized" system, one where many separate conversations are going on at once. Hence, for each conversation, a set of values is stored. All these values are circulated in synchronism so that the actual controller (voice direction switches) only works with one set at a time.

The regulating signal storage means contains an arithmetical means, with which the output signal of the comparison means controls the arithmetical means in the regulating signal storage means in a manner such that when the stored signal value of the open channel is equal to or less than the stored signal value of the closed channel, the recirculated regulating value of the closed channel is increased by one regulating stage magnitude for each first established time unit. When the stored signal value of the open channel is greater than the stored signal value of the closed channel plus a regulating stage magnitude, the recirculated regulating value of the closed channel is reduced by one regulating stage magnitude for every other established time unit. The stored signal value in the time phase of each channel after action by the regulating value of the closed channels is compared with the sampled signal value at the moment, and if the signal value is less than the stored signal value, the arithmetical means in the recirculation loop of the signal storage means reduces the recirculation signal value by one regulating stage magnitude for every third established time unit. But if the signal value is greater than the stored signal value, this is introduced as a replacement of the stored signal value. Thus, each microphone channel is examined by the same controller at different times. Hence, each channel is examined by the same controller at different times. Hence, each channel has its own special time that is "time phase." The final regulating value is always less than the actual value but no less than 1, thereby providing a round off factor which prevents the digital system from "hunting" for an exact value.

In this manner, apparatus with widely different overhearing characteristic or with greater distance between loud-speaker and microphone, where the acoustic conditions of the room are decisive to the overhearing characteristic, may then be directly used indiscriminately in a single system. For example, a change in the acoustic conditions as drastic as the transition from high-speaking to low-speaking reproduction is immediately adjusted. Furthermore, the speech channels can be provided with automatic amplifying control without consequences for the speech switching quality. As explained before, a regulating value is calculated. However, in order to allow the system flexibility, i.e. to allow varying acoustic coupling between loud-speaker and microphone, this value must be continually recalculated.

The expressions "open" and "closed" channel should be understood to mean open and closed respectively to speech transmission, and the expression "arithmetical means" should be understood to mean a circuit able to add or subtract signal values.

Further features of the invention will be apparent from the following.

Some embodiment examples of the invention are further explained hereinbelow with reference to the drawings.

FIG. 1 is a very simplified general diagram of a centralized system according to the invention.

FIG. 2 shows the various time phases of the system on FIG. 1.

FIG. 3 shows a very simplified general diagram of a decentralized system according to the invention.

FIGS. 4A, B and C show various forms of the speech signal in a system according to the invention.

Figure 5:
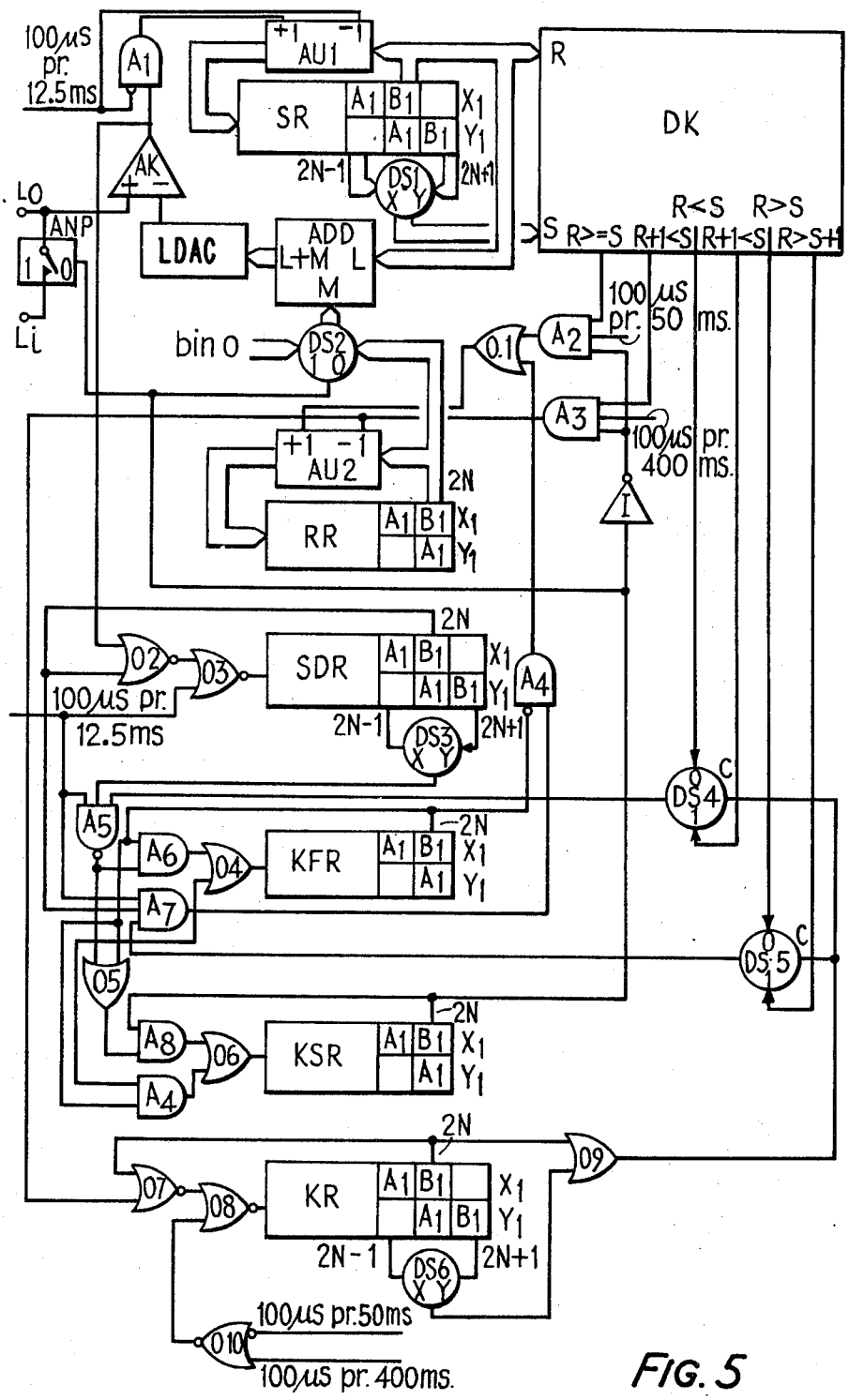
Figure 6:
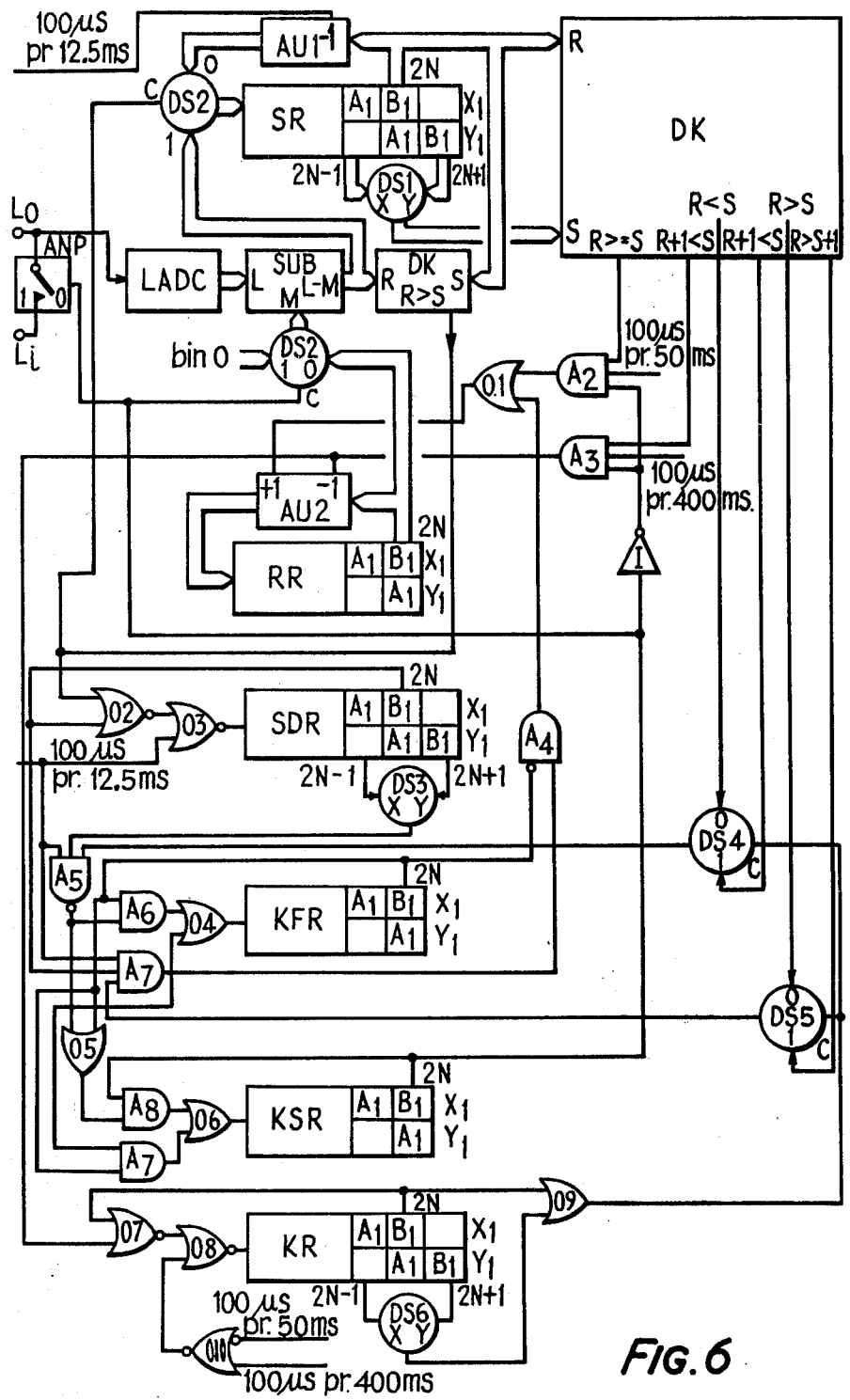
Figure 7:
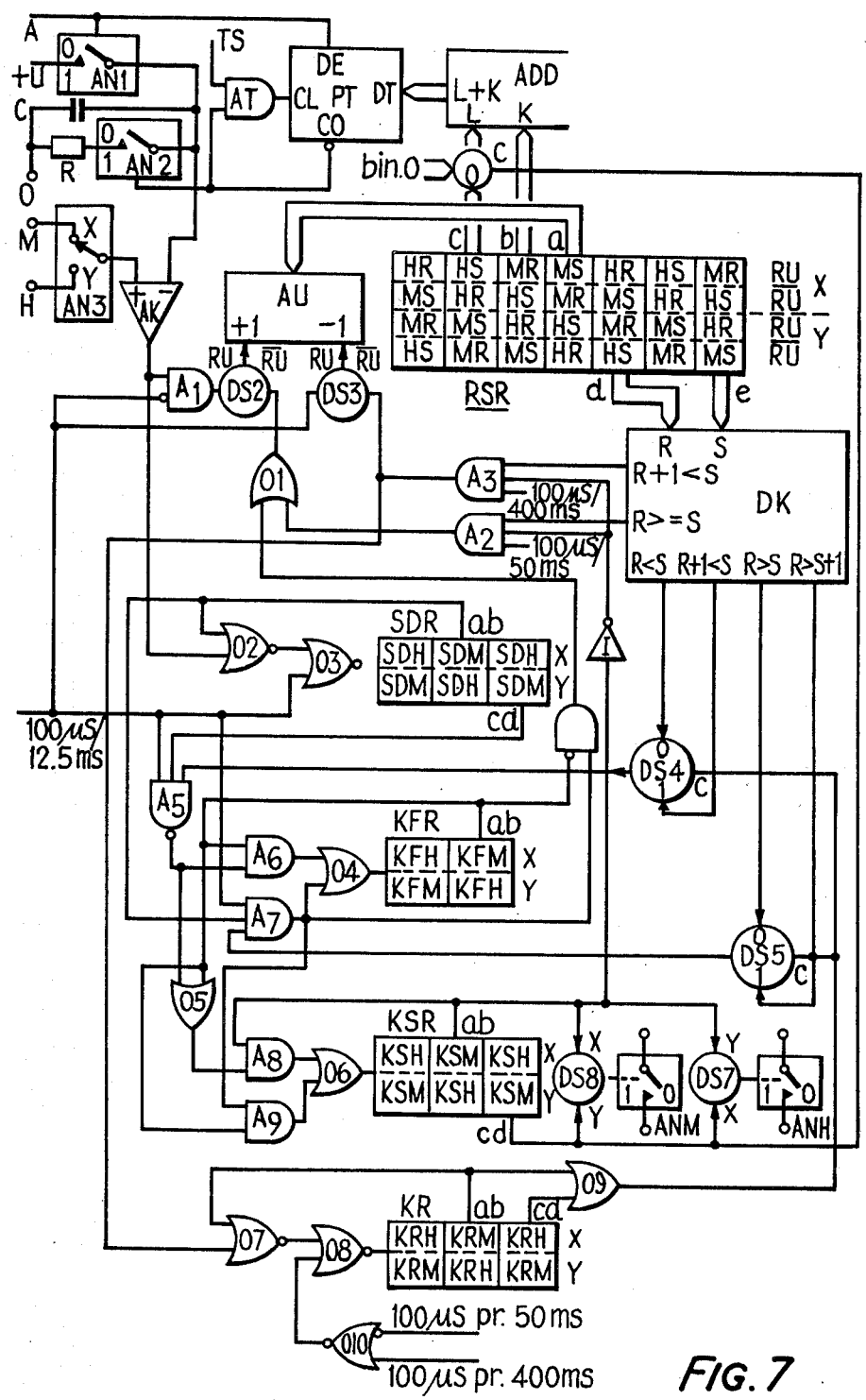

FIGS. 5, 6 and 7 show block diagrams of three embodiment examples of the system according to the invention.

Figure 8:
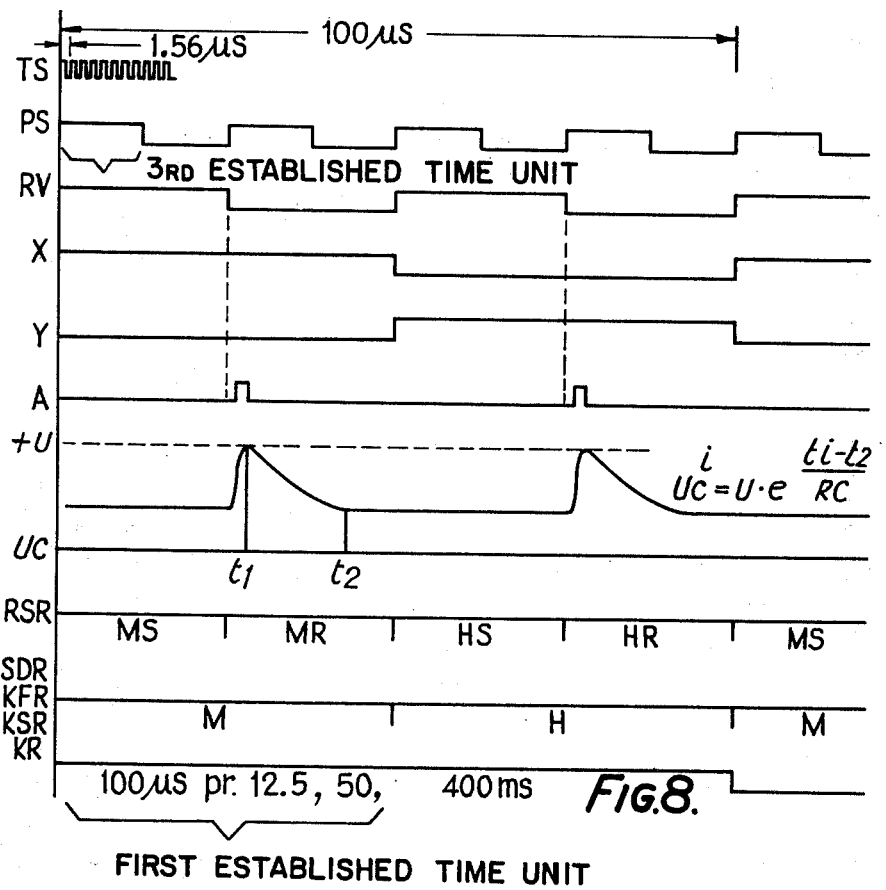

FIG. 8 shows the various time phases of the system on FIG. 7.

Figure 9:
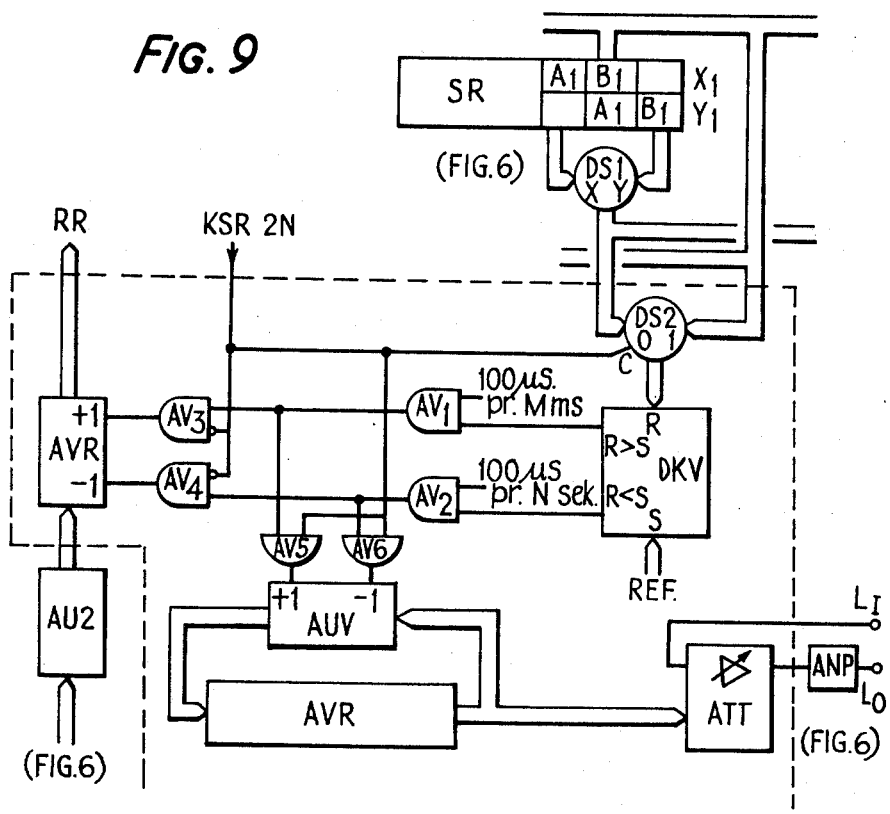

FIG. 9 shows in diagram how compression of the cross talk signal can be cancelled by action of the regulating signal value.

Figure 10:
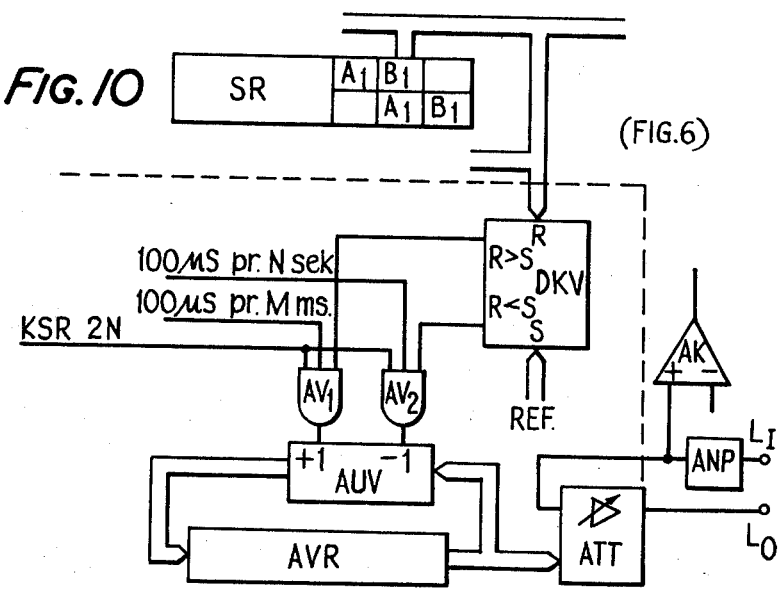

FIG. 10 shows in diagram how compression of the cross talk signal can be equalized in that the speech signal of the open channel is compressed in the same proportion.

Figure 11:
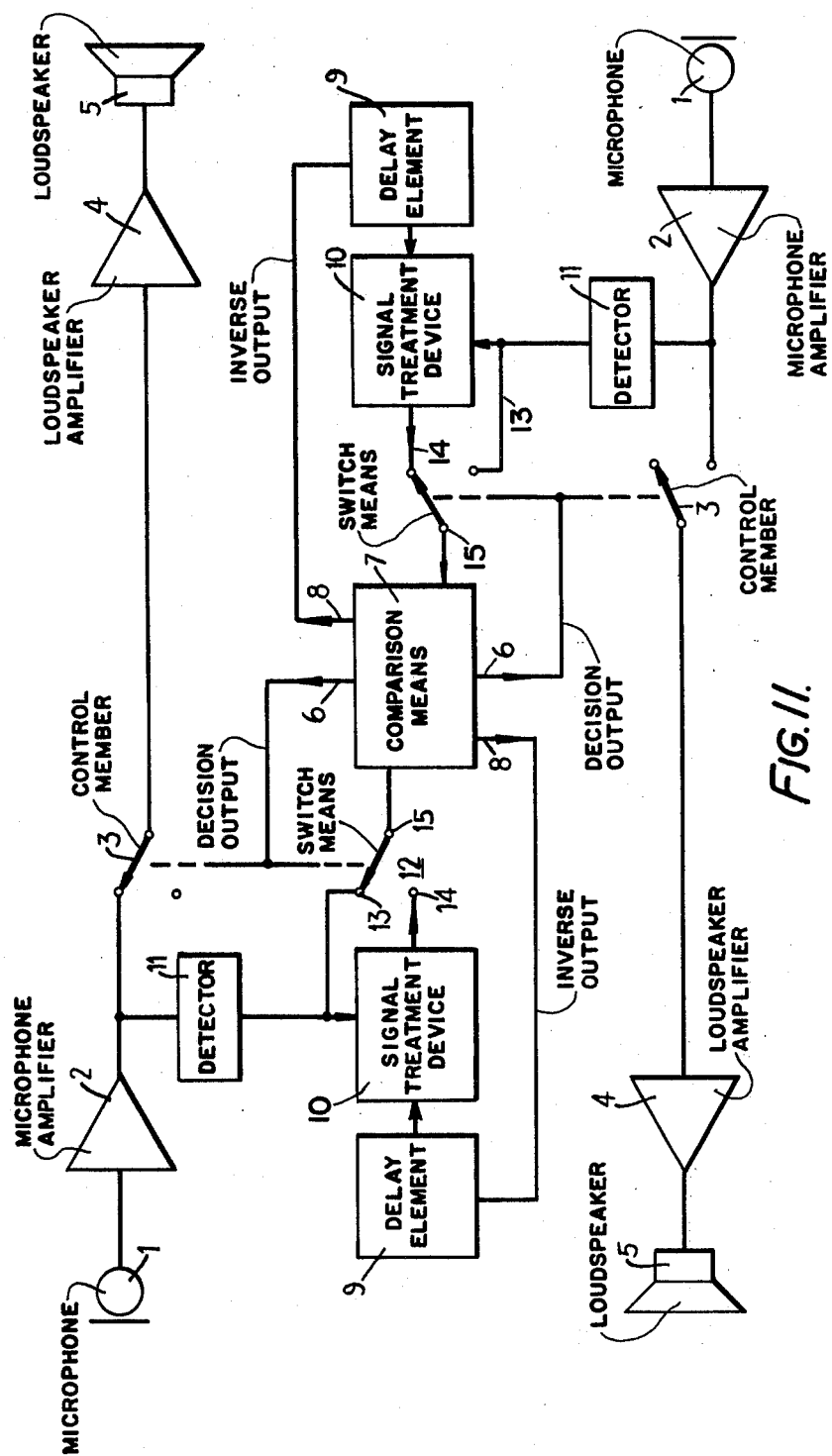

FIG. 11 shows a block diagram of a simplified system according to the invention.

The system is suitable for use both in centralized and decentralized communication apparatus, and particularly where speech channels are time multiplex divided, the control system is extremely advantageous, in that only one common control system is necessary in order to serve all speech channels.

A possible construction of the speech channel division in such a system is illustrated in FIG. 1. FIG. 2 shows the various time phases of the system.

In FIG. 1, a plurality of telephone stations are shown each having a microphone M and a loud-speaker H, connected to associated circuitry which will be discussed below. Each A-lettered station is in communication with its corresponding numbered B-lettered station, i.e., station $A_1$ is in communication with $B_i$ and $A_i$ is in communication with $B_i$. For simplicity, the microphones and associated circuitry of all stations are shown at the left while the loud-speaker and associated circuitry of all stations are shown at the right. Each set of stations in communication with each other will merely be referred to as a "speech communication."

Each speech communication is represented by two time phases, $x_i$ and $y_i$. The microphone amplifier MF of each apparatus can, in one of these time periods, be connected to a common speech output line LO through the analogue switch ANO, while the input of the loud-speaker amplifier HF of each apparatus can be connected to the common speech input line LI through the analogue switch ANI. On communication between apparatus A1 and B1, the microphone channel of apparatus A1 and the loud-speaker channel of apparatus B1 are, for example, connected to LO and LI respectively in the time period Y1, while the loud-speaker channel of A1 and the microphone channel of B1 are connected to LI and LO respectively in the time period X1. If the analogue switch ANP between LO and LI is connected in the time period Y1, there will be speech connection from A1 to B1, on the other hand, if ANP is connected in the time period X1, there will be speech connection from B1 to A1. The modulator S and demodulator D are dependent on the type of signal modulation used. In the event of PAM (pulse-amplitude-modulation) S and D may be pure low pass filters. The block DP indicates the speech control system which, by control of the analogue switch ANP, can determine the speech direction of all communication channels in the system, on the basis of the sampled speech level information occuring in the speech output line LO.

FIG. 3 shows a possible construction of a speech connection in a communication system with decentralized speech direction control. Each apparatus may then, inter alia, contain a microphone M with amplifier MF, a loud-speaker H with amplifier HF, two analogue switches ANM and ANH for connection of microphone channel and loud-speaker channel respectively, and, in the event of two-wire line connection, hybrid junction G.

If the analogue switch ANM in apparatus A and ANH in apparatus B are actuated simultaneously, there will be speech connection from A to B. In the opposite case, i.e. that ANH in apparatus A an ANM in apparatus B are actuated simultaneously, there will be speech connection from B to A.

Each apparatus is provided with respective duplex control system DP which controls the actuation of the analogue switches on the basis of signal information in front of the analogue switches by continuous sampling of the signal information from these points.

Since the speech direction is predominantly to be determined by the magnitude of signal application exerted by the respective signal sources on the system, the exchange of speech direction will, in principle, be controlled by comparison at any time between the magnitude of control signals taken from the microphone amplifiers.

In order for such a comparison to be possible in practice, as much as possible of the control signal component in the closed channel, derived from the signal source of the open channel due to overhearing between loud-speaker and microphone of the closed channel, the hybrid junction, and the like, must be suppressed. Due to the distance between loud-speaker and microphone, room echo and the like, a suppression by direct phase comparison is difficult, particularly in a digital treating system based on sampled information. On the other hand, a comparison of the envelope curves of the control signals is much simpler in that it is possible, in the main, to disregard the phase difference between the envelope curves of the control signal in the open channel and the overhearing component in the control signal in the closed channel due to signal delay from loud-speaker to microphone (about 0.5 ms). Practically speaking, all speech control systems used at the present time use analogue circuit techniques, and are based on comparison of the rectified envelope curves of the control signals (signal detection).

In addition to the phase distortion to which the overhearing component is subjected, substantial frequency distortion arises since the frequency characteristic from loud-speaker to microphone, possibly over the hybrid junction, is far from a linear characteristic.

In order to achieve effective switching quality, practically all systems based on analogue circuit technique are provided with frequency correcting links in front of the detector circuits in both or one of the control signal channels. The frequency correcting links are usually permanently adjusted, which necessitates a relatively powerful acoustic connection between loud-speaker and microphone to dampen the effect of external, more variable conditions such as difference in room acoustic, etc.

Also the control signal channels generally operate with permanently adjusted amplifying factors which are directly determined by the loud-speaker microphone transition of the apparatus. This, in addition to what was previously described, requires that the loud-speaker/microphone transition characteristics of the various apparatus must operate within very narrow tolerance limits, in order to achieve good switching quality.

In order for a digital speech control system, where the signal levels occur in sampled form, to be realizable with a reasonable (inexpensive) circuit technique, the frequency correcting links must be entirely omitted.

An embodiment example of a digital system according to the invention in case of a centralized apparatus with time multiplexing speech channels corresponding to FIGS. 1 and 2, is illustrated in the block diagram of FIG. 5. The speech channel system operates here with pulse amplitude modulation (PAM).

In order to obtain simple circuit technique for the logarithmic analogue/digital conversion, the signal shift register SR is included in this process.

Since the conversion takes place logarithmetically, the word magnitude of the signal register SR, is only four or five bits, depending on the desired signal level definition. At the level stage of 3 dB, i.e. smallest incremental digital change equals 3dB, only four bits are necessary. SR has a length of 2N+1 bits where N is the number of different speech communication links between different sets of stations capable of the system is providing.

Figure 4:
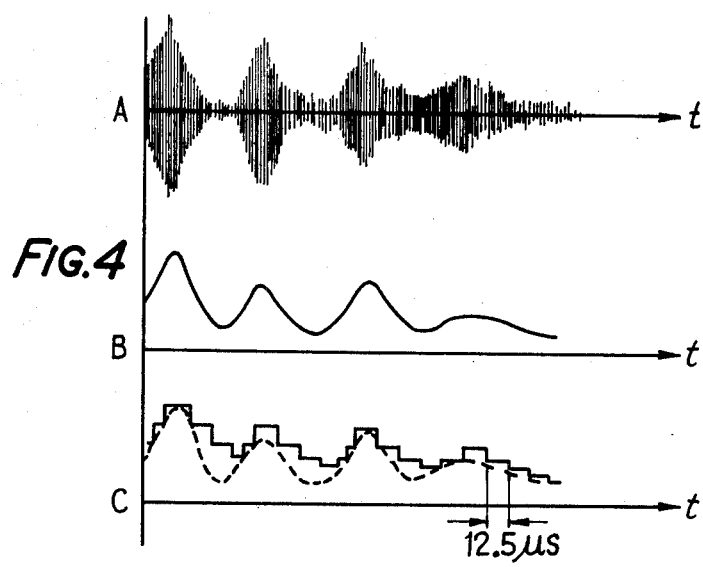

FIG. 4 then shows a normal speech signal A, the rectified envelope curve B of the speech signal and the approximate and quantitized, rectified envelope curve C, as it occurs in SR. With a sampling frequency of 10 kHz, i.e. a repetition time of 100 /µs, the register shift frequency is:

$$F_{rs} = (2N/100) \text{ MHz}$$

The period time of a single communication is then:
$$T_s = (100/N) \text{ Ms}$$

Half of the time period Ts is used for A subscriber's microphone channel i.e. the $y$ phase, the second half which is the $x$ phase corresponding to B subscriber's microphone channel.

The recirculating loop of SR is taken out after 2N bits but SR's stored content must be accessible after 2N−1 and 2N+1 bits so that during any one time phase, signal storage information recorded in another time phase will be accessible.

Since the system operates in time multiplex, it is sufficient to regard the sequence of events for a single channel, for example, communication L represented by the time phases X1 and Y1, inasmuch as all other communications are treated in the same manner and by the same circuits.

Referring back to FIG. 5, in the time phase X1, an immediate value of the signal from B subscriber's microphone amplifier occur on the speech output line LO, simultaneously as the binary value stored on B subscriber's place in the signal register SR occurs on the input L to the adding circuit ADD.

If the B is subscriber microphone channel is open, a data selector DS 2 ensures that ADD's other input M is supplied with the binary value "0". In such case, ADD's add output L+M has the same binary value as the input L. ADD's add output (L+M) is connected to a rapid five or six bit logarithmic digital/analogue converter LDAC. The analogue output from LDAC is connected to the negative input of a rapid voltage comparator circuit AK. If the present value of the signal from B subscriber's microphone amplifier, which now occurs on AK's positive input in that this is connected to LO, is greater than the voltage on LDAC's output, AK's output will assume logic "1" and, via AND gate circuit A1, ensure that an arithmetic unit AU1 which is in SR's recirculation loop adds 1 to B subscriber's binary signal value which is stored in SR.

Another part of task is to substract 1 from all magnitudes stored in SR each 12.5 ms. To accomplish this, the −1 control input thereof is supplied with logic "1 " in 100 µs per 12.5 ms.

As explained hereinbelow, comparison of the signal values in SR are only undertaken in the same 100µs per 12.5 ms. This means that 125 samplings for increase of the signal value will be undertaken after each reduction of 1 stage before the signal values are evaluated by the system in connection with the speech switchings. In practice, the rate of signal increase will be sufficient, despite the fact that it takes place with a one stage at a time. The signal values of the B channel in SR then describe the envelope curve of B subscriber's microphone signal.

If, on the other hand, B subscriber's microphone channel (B channel) was closed, the data selector DS2 would ensure that ADD's input M was not supplied with binary value "0", but with a regulating signal from a regulating shift register RR. The output L+M fron ADD is then the regulating signal value greater than the binary value stored in SR. In order for an increase of the signal value in SR to take place, the logarithm of the instant value of B subscriber's microphone signal occuring on LO, must be at least the regulating signal value greater than the signal value in SR. This means that the signal values in SR describe a signal with an envelope curve which is the envelope curve of the B subscriber's microphone signal less the envelope curve for the regulating signal.

A possible addition to the SR content in the period 100 μs per 12.5 ms is not desirable. The AND gate circuit A1 ensures that addition of 1 to the SR content is blocked during these time periods.

In the time phase Y1, A subscriber is treated in precisely the same manner as described for the B subscriber in the time phase X1.

During the time phase X1, the stored binary value of the B subscriber in SR will be applied to the input R in digital comparator circuit DK, while the A subscriber's stored binary value in SR by means of a data selector DS1 which has its input connected to SR's 2N−1 output, is applied to the input S. In the time phase Y1, the opposite is the case, since A subscriber's binary value in SR is now applied to input R simultaneously as B subscriber's binary value in SR, by means of the data selector DS1 which now has its output connected to SR's 2N+1 output, is applied to the input S.

In this manner, it is possible in both time periods to compare the magnitude of A and B subscriber's stored binary values in SR.

The regulating register RR which has a word magnitude equivalent to that of the signal register (in this case four bits) and a length of 2N bits, operates synchronously with the signal register SR, since here also the recirculation loop is disconnected after 2N bits.

RR's task is at all times to store a regulating signal for each speech channel, which corresponds approximately to the difference in the envelope curves of the closed channel's speech signal and the open channel's speech signal which is due to the frequency distortion and level change in the cross speech signal in relation to the speech signal of the open channel. In other words, the difference between the binary values applied to the comparative inputs S and R is predominantly to originate from external speech signal sources and not the cross speech signal. In addition, signals from sources which are not directly of a speech signal nature, such as continuous noise signals with a relatively constant level, will also be suppressed by means of the regulating signal.

The basic idea of the construction resides in the assumption that a typical speech signal changes more rapidly in level on, for example, attempts to switch from a closed channel (breakthrough), than the level changes occuring on a cross speech signal caused by the frequency spectrum of the speech signal being shifted over a frequency distortion link, corresponding loud-speaker to microphone transition, hybrid overhearing and the like.

One assumes, further, that changes in the cross speech signal level due to changes in the acoustic conditions of the rooms in which the apparatus are located, take place even more slowly. As previously stated, the signal values stored in SR for a closed channel describe the rectified envelope curve of the logarithm of the speech signal amplitudes minus the regulating signal values. By changing the regulating signal value, it is possible to determine the difference between the signal values in SR of the open and closed channels. When operating with signal values which are the logarithm of the speech signal levels, it is possible to proportionally change the signal values by pure addition or subtraction.

In order to achieve a regulating signal which has the previously mentioned necessary properties, an arithmetic unit AU 2 in RR's recirculation loop works in the following manner, if one is in the time phase of a closed channel.

1. Add 1 to the regulating signal value of the channel in SR each 50 ms via AND gate circuit A2 and OR gate circuit 01, if $R > = S$ i.e. if the signal value of the closed channel in SR is greater or equal to the signal value of the open channel in SR.
2. Subtract 1 from the regulating signal value of the channel in SR each 400 ms via the AND gate A3 if $R+1 < S$ i.e. if the signal value of the closed channel in SR is less than the signal value of the open channel in SR minus 1.
3. Allow the signal value of the channel to be unchanged if $S = R+1$ i.e. if the signal value of the closed channel in SR is 1 less than the signal value of the open channel in SR.

The system thus attempts, within certain adjustment rate restriction to place the signal value of the closed channel in SR, a level unit below the signal value of the open channel in SR.

The channel control system is bistable, i.e. it has only two stable states either that the A channel is open and the B channel is closed, or reverse. The condition for transition from one stable state to the other, i.e. channel switching, is that the signal value of the closed channel in SR for a time is greater than the signal value of the open channel in SR. However, channel switch can only take place if the increase of the signal value of the closed channel in SR is more rapid than the most rapid the regulating signal value of the closed channel in RR is capable of increasing.

The rate at which the regulating signal is to have the possibility of increasing or decreasing its value by, can be determined from the following remarks:

1. If the regulating signal value cannot increase with sufficiently rapidity, an increase in the cross speech level, due to the frequency spectrum in the speech signal changing in a manner such that the cross speech transition increases, will not be sufficiently rapidly adjusted into the regulating signal. The system may then interpret this as an attempt at breakthrough from the apparatus with the closed microphone channel.
2. If the regulating signal was able to increase too rapidly, an actual breakthrough attempt from the apparatus with the closed microphone channel would also be adjusted into the regulating signal, so that a channel switch would be difficult or impossible.

3. If the regulating signal has a possibility of decreasing too rapidly, a decrease in the cross speech level due to the frequency spectrum of the speech signal changing in such a manner that the cross speech transition decreases too rapidly, this will be adjusted into the regulating signal, so that a change of the frequency spectrum in opposing direction immediately afterwards after a channel switch to too great an extent could be interpreted as a breakthrough attempt from the apparatus with the closed microphone channel.

4. If the regulating signal value was unable to decrease sufficiently rapidly, it would take too long a time before the system adjusted to optimal switching quality again after a channel switch, or after a sudden decrease of the cross speech transition by, for example, transition from loud-speaking to low-speaking communication.

Practical experiments have given the following change rate restrictions for the regulating signal level, which are considered to be the optimal for the system as described herein.

Regulating signal level-increase: 3 dB per 50 ms,
regulating signal level-decrease: 3 dB per 400 ms,
In a signal level decrease in SR of: 3 dB per 12.5 ms.

And order for a channel as rapidly as possible to achieve an optimal regulating signal value after being switched to closed position, the initial value of the regulating signal in blocked state is the same as it had when the channel was previously blocked, since the probability of particular changes in the cross speed conditions during the time the channel was in open position is small. This is achieved in that the AND gate circuits A2 and A3, via an inverter I, are blocked when the channel is open and prevent this from changing its regulating signal value as long as the channel is in open state.

As previously stated, evaluation of the speech directions are carried out only each 12.5 ms, so that, inter alia, the analogue digital conversion has sufficient time. However, since the channel control information must occur in all "sample" periods, these have intermediate storage in the channel control register KSR, therefore, which is a one bit shift register with length of a 2N bit and operates synchronously with the other registers. In the time phases X1 and Y1 respectively, the channel control information for communication 1's B and A subscribers will occur on the 2N output of the register. The channel which is open occurs with logic "1" information, while the channel which is closed occurs with logic "0". The 2N output of the register controls the AND gate circuits A2 and A3 through the inverter I, the data selector DS2 and the analogue switch ANP between the speech lines LO and LI. If, for example, KSR's 2N output has logic "1" in the time phase X1, amendments in the regulating signal's value in the same time phase will be blocked in that A2 and A3 are blocked, the data selector DS2 will connect binary value "0" to input M on ADD, and ANP will be closed, so that the B subscriber's microphone channel is open. In such case, logic "0" will occur in the time phase Y1 on KSR's 2N output, so that, in the same time phase, the AND gate circuits A2 and A3 will be open and allow adjustment of the regulating signal value, DS2 will connect RR's 2N output to M in ADD and ANP will be open, so that the A subscriber's microphone is blocked. If, in the time phase X1, KSR's 2N output has logic "0" and thereby in the time phase X1 is logic "1", the reverse will be the case.

The channel control register KSR cannot directly be controlled by comparisons which the comparator circuit DK effects between the A and B subscribers' signal values in SR, since the regulating signal in RR cannot completely prevent instability in the form of repercussion in an open channel caused by its own speech signal, in that the channel switching arises due to components in the cross speech signal in the closed channel which are not effectively suppressed. The main reason for this is that the quantitized signal values give too rough a picture of the analogue levels. For example, both an analogue level of 2.01 V and 2.99 V will have the same binary value if one of the intervals in the analogue/digital conversion was from 2.00 V to 3.00 V.

In order to increase the stability, three one bit auxiliary registers are introduced. KFR which has a length of 2N bit, and SDR and KR which have lengths of 2N+1 bits with recirculation loop or 2N bits. All operative synchronously with the other registers.

By means of these three registers, full stability is achieved in practice with signal value stage of 3dB. By improved signal value definition, i.e. lower stage values, one or more of these registers may be omitted. However, since this means several stages in practice, this increases the circuit complexity in that the word magnitude in the circuits SR, DK, ADD, AV1, AV2, DS1, DS2, RR and LDAC must be increased.

The solution which is most economical as to circuits must be considered to be with value stage of 3 dB and use of the three auxiliary registers.

The signal derivation register SDR contains information regarding the positive derivative of the rectified envelope curve for the speech signal of the respective channels, i.e. whether an increase of the signal values has taken place in the period between 100 $\mu$s per 12.5 ms impulses. This takes place in that SDR is reset (is brought to logic "0") each 100 $\mu$s per 12.5 ms via the NOR gate circuit 03, and is brought into logic "1" in the time phase of a channel, the speech signal value of said channel in SR having had an increase, since one input of the NOR gate circuit 02 is connected to the AK output of the voltage comparative circuit. O2's other input is connected to SDR's 2N output in order to form the recirculation loop.

The data selector DS3 ensures that the stored information of the A channel in SDR is accessible in the B channel's time periods and the reverse. In order that logic "1" is to be placed in a channel's time phase in the channel control register KSR, i.e. switching from closed to open channel, the following requirements must be filled.

a. The signal value of the closed channel in SR must be greater than the signal value of the open channel in SR for at least two subsequent 100 $\mu$s per 12.5 ms periods.

This will prevent erroneous channel switching due to too rough quantitizing of the control signals, since the chance of error in this connection twice in succession is small.

b. The signal value of the closed channel in SR must be registered with a signal value increase in the same two subsequent 100 $\mu$s per 12.5 ms periods.

This prevents the channel from switching in illogical moments, viz. when no signal level increase occurs in the closed channel's control signal, as a breakthrough attempt is always characterized by a speech signal increase. A possiblity of channel switching error, which is thereby eliminated is, for example, that the speech signal value in the open channel decreases more rapidly than the speech signal value of the closed channel after a speech signal, in that the echo effect in the room in which the apparatus with the closed channel is located, maintains the speech signal.

In order for logic "0" to be introduced into the channel control register KSR in a channekl's time phase, i.e. switching from open to closed channel, this must take place simultaneously in that logic "1" is introduced into KSR in the other channel's time phase in order that the channel switching system is to be bistable. The following requirements must therefore be met in order for logic "0" to be introduced into KSR.

c. The signal value of the open channel in SR must be less than the signal value of the closed channel in SR for at least two subsequent 100 μs per 12.5 ms periods.
d. The signal value of the closed channel in SR must be registered with a signal value increase in the same two subsequent 100 μs per 12.5 ms periods.

The channel control register KSR cannot alter its data content before 12.5 ms after the delay register KFR has altered its corresponding data content.

KFR and KSR can only alter their data content in each period of 100 μs per 12.5 ms, as this impulse is applied to one of the inputs of a NAND gate circuits A5 and an AND gate circuit A7. As previously stated, the result of the value comparisons which the comparative circuit DK carries out between the speech signals will only be of significance in this time period. Alterations of data content which the comparison causes in KFR and KSR will have no return effect whatsoever, since they occur first on the registers' 2N outputs 2N shift pulses, i.e. 100 μs after introduction, i.e. outside the 100 μs per 12.5 ms period.

The two other inputs in the AND gate circuit A7 are applied respectively to SDR's 2N output and DK's output R>S via the data selector DS5. If the signal value in SR or the channel whose time period is presently used is greater than the signal value in the opposing channel, the signal value in the first said channel has increased during the last 12.5 ms, i.e. logic "1" occurs in SDR and one is in a 100 μs per 12.5 ms period, logic "1" will be introduced into KRF and occur on the 2N output thereof 100 μs later.

The AND gate circuit's A7 output is also connected to one input of the AND gate circuit A9 so that logic "1" is also introduced into the channel control register KSR via the OR gate circuit 06, if KFR had had logic "1" introduced in front in the period 100 μs per 12.5 ms, since the other input of A9 is connected to the 2N output of KFR which must thereby occur with logic "1" in order that A9 shall not block the information from A7.

KFR and KSR have recirculation via the AND gate circuit A6 and OR gate circuit 04, respectively, the AND gate circuit A8 and OR gate circuit 06.

The two other inputs of the NAND gate circuit A5 are applied respectively to the opposing channel's information in SDR via the data selector DS3 which, in the X phase has its output connected to SDR's 2N−1 output, whilst, in the Y phase, it has its output connected to SDR's 2N+1 output, and the digital comparative circuit's DK R<S output via the data selector DS4.

If the signal value in SR of the channel in whose time phase one is less than the signal value of the opposing channel, and the signal value of the opposing channel has increased during the last 12.5 ms, and one is in a 100 μs per 12.5 ms period, logic "0" will be introduced into KFR and occur at the output thereof 100 μs later, in that the recirculation loop in this time period is interrupted in that the AND gate circuit A6 is blocked by logic "0" from A5's output.

The A5 output of the NAND gate circuit is also connected to one input of the OR gate circuit 05, so that logic "0" is also introduced into the channel control register KSR in that A8 is blocked since its other input is connected to the output of 05, if KFR had had introduced logic "0" in the preceding period 100 μs per 12.5 ms, since the other input of 05 is connected to the 2N output of KFR.

There is also a possibility of incorrect channel switching if the regulating signal in the regulating register RR has too low a value because the quantitizing of the control signal gives a too rough picture of the cross speech condition. To begin with, therefore, it is always assumed that a breakthrough attempt is due to a single case of such a regulating signal error, in that one stage magnitude is added to the regulating signal value when "1" is introduced, into the channel delay register KFR. After 12.5 ms when a new comparison of the signal values in SR is carried out to determine whether logical "1" is also to be introduced into the channel control register KSR, the closed channel signal value in SR has been modified after addition to one in the regulating signal value.

This takes place in that one input of the AND gate circuit A4 is applied to the putput magnitude from A7, while the other input is applied inverted to KFR's 2N output magnitude, so that A4 is blocked in the time periods when KFR's 2N output logic "1" and this means that the addition of one regulating stage magnitude to the regulating signal value does not take place after logic "1" is introduced into KFR.

A second possiblity for a too low value of the regulating signal value is in the first 50 ms after the value has beeen reduced by one, because the regulating signal value can only increase by one regulating stage magnitude again each 50 ms. It is not possible, therefore, to correct any too drastic reduction of the regulating signal value which is due to the fact that the quantitized signal values have too rough a division, before after 50 ms. In order to repair this, the sensitivity of the comparative circuit is decreased by one regulating stage magnitude per 50 ms, if a reduction in the regulating signal value has taken place. This is carried out via the control register KR.

If the regulating signal value in RR for a closed channel is decreased by one regulating stage magnitude, logic "1" will be simultaneously introduced into KR via NOR gate circuits 07 and 08, in that the one input of 07 is connected to the output of A3, 07's other input is connected to KR's 2N output in order to achieve recirculation. 50 ms later, logic "0" will be introduced into KR in that the 010 output of the NOR gate circuit is logic "1" in all 100 μs per 50 ms periods with exception of the period which coincides with 100 μs per 400 ms, where introduction of logic "1" can occur.

The data selector DS6 which, in the X phase, connects the output to KR's 2N−1 output and in the y phase connects the output to KR's 2N+1 output, will ensure that the output from the OR gate circuit 09 is logic "1" in the entire time phase of the communication (X+Y), when logic "1" occurs in KR in the time phase of one of the channels (X or Y). The output of 09 is connected to the data selectors DS4 and DS5 control inputs, will, in such case, shift DS4's output from the comparative circuit's DK output $R<S$ to $R+1 <S$, and DS5's output from $R>S$ to $R>S + 1$.

The capability of the system to adjust variations in the cross speech signal during a communication means that the switching quality increases with the weakening of the cross speech signal. The best quality is achieved with great distance between the loud-speaker and the microphone, so that the signal component to the speech source is greater with respect to the loud-speaker signal. Since, in practice, there may be any distance whatsoever between the loud-speaker and the microphone without the channel stability being at risk, the control system can, to great advantage, be used in S.K. conference systems, where one may have, for example, several loud-speakers and microphones in the same room. The control system can also be used to advantage in loud-speaking long distance telephoning where varying hybrid overhearing, humming signals, echo and the like make the use of duplex systems known hitherto practically impossible.

In the embodiment example on FIG. 6, there is a modification of the embodiment of FIG. 5. The analogue signals here are converted to logarithmic digital signal information directly in a logarithmic analogue digital converter LADC. On handling pulse code modulated speech signals, LADC is a necessary part of transmitter/receiver equipment and is thereby outside the scope of the speech control system. The logarithmic digital signal information are introduced to the subtractor input L in a subtracting circuit SUB. The data selector DS2 ensures that SUB's subtracting input M is connected to the binary value "0" in the time phases of the open channels, and to the regulating signal register RR's output 2N in the time phases of the closed channels.

SUB's difference output $(L-M)$ is connected to input R in a digital comparative circuit DK 2, the other input S of which is connected to the output 2N of the signal register SR.

If the signal value from LADC in the time phase of an open channel is greater than the stored signal value of the channel in SR, DK 2's output $R>S$ will assume logic "1" such that the data selector DS ensures that the signal value from LADC is passed directly into SR. In the case of closed channel, the signal value from LADC must be greater than the stored signal value of the channel in SR plus the regulating signal of the channel in PR, since the signal value from LADC minus the regulating signal is to be introduced into SR. If, on the other hand, the signal value from LADC, in the case of an open channel, is less than or equal to the signal value in SR, and in the case of closed channel is less than or equal to the signal value in SR plus the signal value in RR, DK 2's $R>S$ output would assume logic "0", so that DS7 ensures that the signal value SR is maintained on recirculation and decreases successively by 1 stage per 12.5 ms, by means of the arithmetic unit AU1 located in the recirculation loop.

Since the signal values in SR can, in this manner, increase immediately with respect to the signal values from LADC, but can only decrease by one stage per 12.5 ms, the signal value in SR at all times represent the rectified envelope curves of the open channels' logarithmic signal information, and the rectified envelope curves of the closed channels' logarithmic signal values minus the regulating signal values.

The content in the signal register SR is therefore the same as on FIG. 5, so that the remaining circuits in the two examples are the same.

Differentiating the example of FIG. 6 from the example of FIG. 5 is that SR does not take part in analogue/digital conversion, but rather takes place by a separate circuit LADC.

In consequence thereof, the analoque comparative circuit AK can be replaced by the digital comparative circuit DK 2, since the comparative function is not necessary either to the A/D conversion.

In FIG. 5, the combination of the addition circuit ADD and the comparative circuit AK constitutes a subtraction function which, in the example on FIG. 6, must be replaced by the subtraction circuit SUB.

With pulse amplitude modulated (PAM) speech signals the example on FIG. 5 is the most suitable solution, however, with pulse code modulated signals (PCM). FIG. 6 is the best solution. Other modulation forms can also be treated as illustrated on FIG. 6, if LADC is replaced by corresponding converters, i.e. conversion from the actual modulation form to logarithmic binary signal values.

An embodiment example of the digital speech control system as it may occur in a communication system with decentralized speech control corresponding to that illustrated on FIG. 3, is illustrated in block diagram in FIG. 7.

That which predominantly differentiates this embodiment example from the first and second, is the analogue/digital conversion method and the register division. Since the system is to serve two speech channels only (in speech communication), a so rapid operating analoque/digital conversion as in the said example is unnecessary. Since the system is envisaged effected by single integrated circuit, a solution is selected which allows a minimum of discrete elements outside the integrated circuit. "Sequential" logic has also been selected since this constitutes several common circuits for both channels, so that the best possible circuit economy is achieved. The system could of course be effected with other logic forms, for example, static operating with bistable circuits instead of shift registers and the like.

The type of logarithmic analogue/digital conversion selected requires only two discrete circuit elements, the resistor R and the capacitor C.

FIG. 8 illustrates the time phases of the system. The microphone channel and the loud-speaker channel having each its time phase, X phase and Y phase respectively. The two four bit registers SR and RR, in the preceding examples, are here combined to a single seven bit register RSR, so that the same arithmetic unit AU is used for signal value adjustment of both the speech signal value and regulating signal value. RSR has a length of seven bits and five of the register positions are accessible in any time phase, in that the five register cells have respective outputs $a$, $b$, $c$, $d$ and $e$. RSR is operated by the shift impulses RS, so that, with output $a$ as reference, the control signal values occur in the time phases $\overline{RU}$ and the regulating signal values in the time phases $\overline{RU}$.

If, for example, the loud-speaker channel is open and the microphone channel thereby closed, the following takes place:

In the time phases $\overline{RU}$ in Y, the control signal value MS of the microphone channel and the regulating signal value MR of the microphone channel, occur on the K and L inputs respectively in the adding circuit ADD, in that the output b of RSR is connected to K, and the output c of RSR via data selector DS1 is connected to L. In the time phases A, which occur in the beginning of the RU periods, a binary value which is the sum of the regulating signal value and the speech signal value is introduced into the pre-adjustable five bit binary counter PT, in that the data input D thereof is connected to the L+M output of ADD, and the data control input DE of PT is applied to logic "1" in the time phases A. In the time phases A, the capacitor C is also charged to the voltage + U with little time constant, in that the analogue switch AN 1 is connected in the time phases A. When the time phase A is finished, C is discharged over the resistance R, in that the analogue switch AN 2 is connected as long as the add output CO of PT has logic "0", since this in inverted state, is applied to the control input of AN 2. Simultaneously, the counter impulses TS, which are applied to the time impulse input GL of PT via the AND gate circuit AT, start counting. When the counter has reached its greatest counting value, logic "1" occurs at the output CO and blocks AT, since CO inverted is applied to the other input of AT, and locks the counter in this state. Simultaneously, the analogue switch AN 2 also opens so that discharge of C ceases. The time C has had discharge via R, will be the reverse in proportion with the binary value introduced in PT in the time phase A, since PT counts from this value to its greatest counting value during the same time period. Since the voltage Vc over C during discharges decreases exponentially with the time, the binary value introduced in PT represents the logarithm of the voltage Vc over C, after the discharge has ceased. The capacitor C is connected to the negative input of the voltage comparative circuit AK, which has input resistance practically speaking infinitely great with respect to R, so that the voltage remains approximately constant until the end of the time phase RU in C.

In the X phases, the analogue switch AN 3 connects the positive input of AK to the control signal output of the microphone channel (in front of ANM in FIG. 3). If the control signal voltage of the microphone channel on termination of RU in X is greater than the voltage over C, the arithmetic unit AU in the recirculation loop of RSR adds 1 to the control signal value MS, in that the + 1 input of AU receives logic "1" from the output of AK via the AND gate circuit A1 and the data selector DS2, which, in the RU phase connects the output of A1 to the + 1 input of ADD.

In the time phases $\overline{RU}$ in X, the control signal value HS in the loud-speaker channel occurs on the input K of ADD, however, since the loud-speaker channel is open, the data selector DS 1 connects the input L of ADD to the binary value 0. In the same manner as described for the microphone channel, the control signal value HS of the loud-speaker channel at the transition from RU to $\overline{RU}$ in Y, is adjusted in accordance with the voltage which, at the same moment, occurs on the control signal output of the loud-speaker channel (in front of ANH), in that the analogue switch AN 3 connects this to the positive input of AK in the Y phases.

In order, in this manner, to obtain a correct picture of the envelope curves, the amplitude values of the signal voltage must, on average, exist in the moment of adjustment. I.e. that the number of samplings per time unit of the speech signals must satisfy "the sample theorem", i.e. the sampling intervals of about 100 μs. A total recirculation of RSR must then take place during one sampling interval.

The data selector DS 3, in the RU phases, now connects 100 μs per 12.5 ms impulses to the −1 input of AU, so that 1 is subtracted from the speech signal values of both channels once each 12.5 ms. MS and HS which occur on the a output of RSR in the RU phases, will then correspond completely to that described in the first embodiment examples, represent the logaritm of the rectified envelope curves of the speech signal of the open channel, and the speech signal of the closed channel minus the regulating signal.

In the time phases $\overline{RU}$ in X, the speech signal value MS of the microphone channel is connected to the DK input R of the digital comparative circuit, while the speech signal value HS of the loud-speaker channel is connected to input S, in that outputs e and d of RSR are connected to inputs S and R in DK, respectively.

If the microphone channel which is closed has a speech signal value less than the speech signal value of the loud-speaker channel minus 1, 1 can be subtracted from the regulating signal value MR of the microphone channel in that DS 3 connects the A3 output of the AND gate circuit to the −1 input of AU in the $\overline{RU}$ phases.

If, on the other hand, the speech signal value of the microphone channel had been greater or equal to the speech signal value of the loud-speaker channel, 1 would be added to the regulating signal MR, in that DS 2 connects the A2 output of the AND gate circuit via the OR gate circuit 01 to the +1 input of AU in the $\overline{RU}$ phases. Since A2 and A3 respectively can only be open in 100 μs per 50 ms and 100 μs per 400 ms, and both are blocked in the time phases of the open channel, the signal values MR and HR occuring on the a output of RSR in $\overline{RU}$ phases, identical to that described in the first examples, represent the difference in the rectified envelope curves for the speech signal of the open channel and the control signal of the closed channel, which is due to the frequency distortion and level alteration of the cross speech signal with respect to the control signal of the open channel.

The channel control register KSR and the auxiliary registers SDR, KFR and KR are one bit shift registers with a length of three bit. As illustrated on FIG. 8, these have a shift frequency which is half of the shift frequency of RSR, in that the shift inputs thereof are applied to the RU signal. Corresponding to RSR, the microphone channel information thereof occur on the ab outputs in the X phases, while the loud-speaker channel information occur in the Y phases.

The mode of operation is precisely the same as described in the first examples, where the same gate circuit terms are also indicated. The data selectors DS 3 and DS 6 in the first examples are, in this example, unnecessary, since SDR and KR's cd outputs give the same information.

The registers are shifted at the transition from $\overline{RU}$ to RU phase, i.e. at the same moment as DK carries out comparison of the speech signal values MS and HS which are stored in RSR. In the same manner as in the first examples, the comparative circuit's DK outputs can therefore directly control the auxiliary registers and the channel control register.

Since the speech channel system in this case does not need to be time multiplex, the analogue switch of the open channel can be connected in both the X phase and the Y phase, so that low pass filters are unnecessary. This is achieved in that the data selector DS 8 connects the control input of the analogue switch ANM of the microphone channel to the ab output of KSR in the X phases, and to the cd output of KSR in the Y phases, so that the microphone channel's channel control information which is stored in KSR is present on the control input of ANM in all time phases.

In the same manner, the data selector DS7 ensures that the loud-speaker channel's channel control information which is stored in KSR, in all time phases, is present on the control input of the analogue switch ANH thereof, in that the control input in the Y phases is connected to the ab output of KSR and in the X phases to the cd output of KSR.

In order that the pre-adjustable counter PT shall have maximum time for counting, the speech signal values of one channel is introduced in PT in the time phases of the opposing channel. In the case of open channel, the data selector DS 1 must connect binary value "0" to the input L of ADD in the time phase of the opposing channel, in that the control input signal of DS 1 is taken out of the cd output of KSR.

If automatic volume control (AVC) is introduced in the speech channels in an automatic speech switching system, this will usually counteract the speech switching quality, in that a compression of the cross speech signal takes place.

FIGS. 9 and 10 illustrate examples of how these disadvantages can be avoided in the digital speech control system, used in the system on FIG. 5.

The example on FIG. 9 shows how the compression of the cross speech signal can be annulled by the action of the regulating signal value.

The speech signal values in SR are compared with a reference value REF in the digital comparative circuit DKV. The data selector DSV controlled by the 2N output of the channel control register KSR, ensures that the R input of DKV has the signal values of the open channels in SR applied thereto in both X and Y phases.

The AVC register AVR operates synchronously with SR and contains the values of the respective channels for control of the analogue damping network ATT, which is connected in series with ANP between LO and LI. The values in AVR correspond to the logarithm of the damping of the speech signals through ATT. The magnitude of the damping stages is equal to the magnitude of the stages in analogue/digital conversion of the speech signals.

If the signal value of the open channel in SR is greater than REF, the damping over ATT can increase by 1 stage per M ms, in that the arithmetic unit AUV in the recirculation loop of AVR has logic "1" on its +1 input in the time phase of the open channel from DKV's R>S output via the AND gate circuits AV1 and AV5. Simultaneously the regulating signal value in RR of the closed channel increases by 1 stage per M ms, in that the output from the AND gate circuit AV3 which is only open in the time phase of the closed channel, is connected to the +1 input of the arithmetic unit AVR connected in series with AV2.

If the signal value of the open channel in SR is less than REF, the damping over ATT can decrease by 1 stage per N seconds, in that AUV has logic "1" on its 1-1 input in the time phase of the open channel from DKV's R<S output via the AND gate circuits AV2 and AV6. Simultaneously, the regulating signal value in RR of the closed channel will also decrease by 1 stage per N seconds in that the output from the AND gate circuit AV4 which is only open in the time phase of the closed channel, is connected to the −1 input of AUR.

In this manner, changes in the cross speech signal due to the automatic volume control will be immediately adjusted in the regulating signal value of the closed channel, so that the speech switching sensitivity is not affected.

In order that a channel shall, as quickly as possible after switching to open state, achieve its correct channel level value in AVR, the value on channel switching is the same as the last time the channel was open, in that the AND gate circuits AV5 and AV6 are blocked in the time phase for a closed channel, since AV5 and AV6's one input is connected to the 2N output of KSR.

FIG. 10 shows how compression in the cross speech signal is equalized in that the speech signal of the open channel is also compressed in the same proportion.

In this case, the input R of DKV is connected directly to the 2N output of SR. If the signal value of an open channel in SR is greater than REF, the level value of the open channel in AVR increases by 1 stage per M ms, in that the +1 input of AUV is connected to the R>S output of DKV via the AND gate circuit AV1, which is open in the time phase of the open channel. If the signal value of the open channel in SR is less than REF, the level value of the open channel in AVR decreases by 1 stage per N second, in that the +1 input of AUV is connected to the R<S output of DKV via the AND gate circuit AV2 which is also open in the time phase of the open channel.

Since both AV1 and AV2 are blocked in the time phases of the closed channels, the values in AVR do not change during the time one of the channels is blocked.

Since the damping network ATT in this case is connected between the speech output line LO and the positive input in the voltage comparative circuit AK, the speech signal in the open channel is compressed in the same manner as the cross speech signal. Since the speech signal of the closed channel is not compressed due to the fact that the level value in AVR in a closed channel is constant, the cross speech signal will not be further compressed, so that the compression effect is subtracted during comparison of the signal values in SR.

The last said example is most utilizable if the cross speech transition is great. On little cross speech transition (great distance between loud-speaker and microphone) it may, in certain circumstances, be difficult to hold an open channel, since the speech signal of the open channel is compressed with respect to the speech signal of the closed channel.

The example of FIG. 9, on the other hand, is just as utilizable under all circumstances since no compression occurs in the speech signals, and the compression in the cross speech signal is adjusted in the regulating signal.

The system in FIG. 11 represents the most general layout of the system according to the invention for control of the speech direction in a duplex telephone circuit. This system comprises microphones 1, microphone amplifiers 2, control members 3, loud-speaker amplifiers 4 and loud-speakers 5. The control members 3 are controlled by the decision outputs 6 from a comparison means 7 which also has two inverse outputs 8 which via delay elements 9 are connected to each of two signal treatment devices 10 which on a second input receives a signal from a detector 11 which is connected to the transmitting channel between the microphone amplifier 2 and the control member 3. Each control member 3 is coupled to a switch means 12 which has two inputs 13 and 14 respectively and an output 15.

The detector 11 watches the signal level in the speech channel, and if this has the desired value, the control member 3 will maintain the condition shown in the Figure, as to the comparison of the values supplied by the detectors to the comparison device. Slower variations during communication will merely be compensated for by the signal treatment devices while faster variations will result in a change in the speech direction.

Having described my invention, I claim:

1. In apparatus for control of the speech direction in a duplex telephone system having at least a pair of stations interconnected by a single telephone line wherein each station includes a transmitting channel for transmitting a signal representative of the acoustic signals detected at the other channel at each station and includes a transmitting switch means for selectively connecting the transmitting channel to the telephone line, a receiving switch means for selectively connecting the receiving channel to the telephone line and duplex control means connected to the transmitting switch means and the receiving switch means for permitting only one of the channels to be connected with the telephone line to prevent feedback of signal from the receiving channel to the transmitting channel at each station; the improvement in which said duplex control means includes signal treating means connected to said transmitting channel for calculating and storing a regulating value dependent upon the envelope curve of the signal from the transmitting channel wherein the regulating value is equivalent to the factor by which the transmitting signal must be multiplied at any given time to be equal to the receiving signal when the transmitting signal is representative substantially of an acoustic feedback of the signal being received by the receiving channel, said signal treating means including means for adjusting the stored regulating value whenever said regulating value is changing at a rate which is less than a predetermined rate.

2. Apparatus as claimed in claim 1, and means for converting signals into logarithmic digital form and recirculating storage means for storing said logarithmic digital form of signal.

3. Apparatus as claimed in claim 2, and regulating signal storage means for storing the value of the difference between the logarithm of the envelope curve of the signal from the transmitting signal end.

4. Apparatus as claimed in claim 3, and duplex control means connected to more than two stations, said signal treating means and said regulating signal storage means include recirculating storage means for storing signals representative of plural conversations between pairs of stations, said duplex control means operating to control the transmitting channel and receiving channel at each station of each pair of stations.

5. Apparatus as claimed in claim 4, in which said signal treating means includes means for examining the signal from each transmitting channel at a predetermined time within equal, successive time periods.

* * * * *